United States Patent
Kim et al.

(10) Patent No.: US 8,396,143 B2
(45) Date of Patent: Mar. 12, 2013

(54) APPARATUS AND METHOD FOR PILOT TRANSMISSION IN A WIRELESS COMMUNICATION SYSTEM

(75) Inventors: Eun-Yong Kim, Hwaseong-si (KR); Eun-Seok Ko, Seongnam-si (KR); Yung-Soo Kim, Seongnam-si (KR); Myeon-Kyun Cho, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 898 days.

(21) Appl. No.: 12/283,553

(22) Filed: Sep. 12, 2008

(65) Prior Publication Data
US 2009/0067525 A1 Mar. 12, 2009

(30) Foreign Application Priority Data
Sep. 12, 2007 (KR) .......................... 10-2007-0092411

(51) Int. Cl.
*H04L 27/28* (2006.01)
(52) U.S. Cl. ........................................ 375/260; 375/267
(58) Field of Classification Search .................. 375/260, 375/267, 295, 299; 370/329, 341, 203, 208; 455/69, 67.16
See application file for complete search history.

(56) References Cited

U.S. PATENT DOCUMENTS

| | | | |
|---|---|---|---|
| 2007/0280116 A1* | 12/2007 | Wang et al. | 370/236 |
| 2007/0293172 A1* | 12/2007 | Shi et al. | 455/187.1 |
| 2008/0165891 A1* | 7/2008 | Budianu et al. | 375/299 |
| 2008/0212702 A1* | 9/2008 | Pan et al. | 375/260 |
| 2008/0225960 A1* | 9/2008 | Kotecha et al. | 375/259 |
| 2008/0299984 A1* | 12/2008 | Shimomura et al. | 455/446 |
| 2009/0003474 A1* | 1/2009 | Pan et al. | 375/260 |

OTHER PUBLICATIONS

R1-070346, "Comparison of MU-MIMO feedback schemes with multiple UE receive antennas", 3GPP TSG RAN WG1 Meeting #47bis, Philips, Sorrento, Italy, Jan. 15-19, 2007.*
R1-072402, "Dedicated Reference Signals for Precoding in E-UTRA Downlink", Alcatel-Lucent, Philips, 3GPP TSG-RAN WG1 #49, Japan, May 7-11, 2007.*

* cited by examiner

*Primary Examiner* — Aristocratis Fotakis

(57) ABSTRACT

An apparatus and method for pilot transmission in a wireless communication system are provided. The method includes generating a precode and a postcode for coordinated beamforming using channel information of one or more streams for transmitting signals to one or more receive ends, selecting one or more streams to be allocated pilots, updating the precode according to a reference point for representing an effective channel of non-selected streams orthogonal to an effective channel of the selected streams, and precoding signals transmitted through the streams.

12 Claims, 7 Drawing Sheets

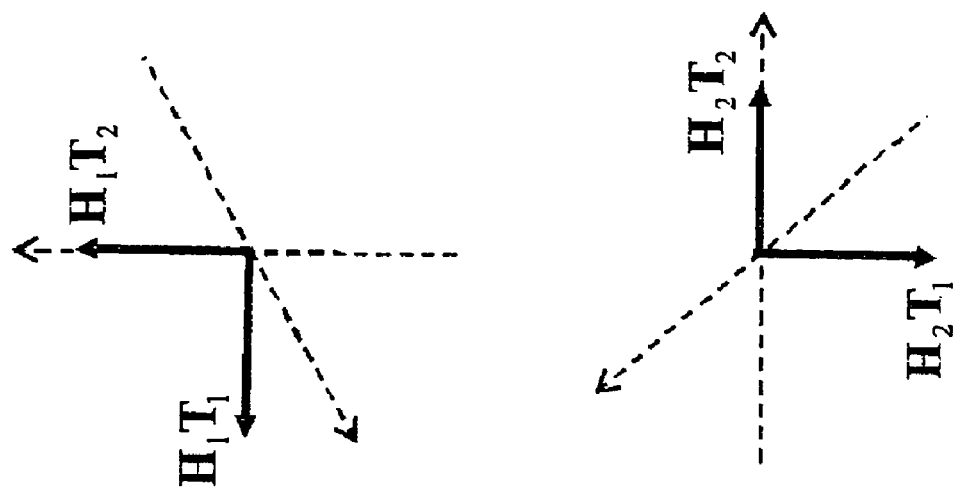
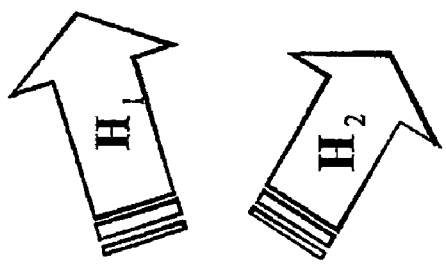
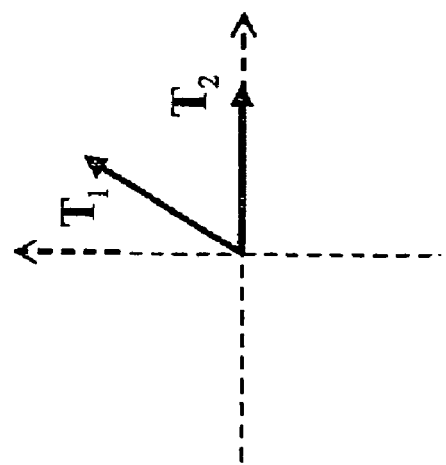
FIG. 2A
FIG. 2B

APPARATUS AND METHOD FOR PILOT TRANSMISSION IN A WIRELESS COMMUNICATION SYSTEM

CROSS-REFERENCE TO RELATED APPLICATION(S) AND CLAIM OF PRIORITY

This application claims priority under 35 U.S.C. §119 (a) to a Korean Patent Application filed in the Korean Intellectual Property Office on Sep. 12, 2007 and assigned Serial No. 2007-92411, the contents of which are herein incorporated by reference.

TECHNICAL FIELD OF THE INVENTION

The present invention relates to an apparatus and method for transmitting a pilot signal in a wireless communication system. More particularly, the present invention relates to an apparatus and method for reducing an overhead caused by pilots signal in a multiuser multiple antenna system.

BACKGROUND OF THE INVENTION

The rapid growth of the wireless mobile communication markets leads to a demand for a variety of multimedia services in the wireless environment. Thus, the recent progress of high capacity of transmission data and high speed of data transmission to provide the multimedia services promotes research on a multiple antenna system (e.g., a Multiple Input Multiple Output (MIMO) system) enabling the efficient use of a limited frequency.

The multiple antenna system transmits data using channels independent from each other by antenna, thus being capable of increasing transmission reliability and transmission rate compared to a single antenna system with no additional frequency or transmit power allocation. The multiple antenna system allows multiple users to simultaneously share a space resource secured through a multiple antenna, thus being capable of more increasing frequency efficiency.

The multiuser multiple antenna system uses a beamforming technique to reduce interference between users. For example, the multiple antenna system can use a coordinated beamforming technique to reduce interference between users. In order to use the coordinated beamforming technique, a transmit end communicates with multiple users through a linear operation. At this time, the transmit end does not use a unitary matrix as a precoder.

When using the coordinated beamforming technique, a transmit end generates a precoder and postcoder using downlink channel information. The precoder and postcoder have vector or matrix values.

The transmit end generates a precoder and postcoder for reducing interference between users at a time a receive end postcodes a signal precoded and transmitted by the transmit end.

The transmit end transmits a dedicated pilot signal orthogonally distributed to each receive end such that each receive end can recognize a postcoder allocated to itself. For example, when transmitting pilot signals to two receive ends, the transmit end allocates pilot tones to the respective receive ends using a subchannel of a tile structure constructed as shown in FIG. 1 below.

FIG. 1 is a diagram illustrating a subchannel structure of a wireless communication system according to the conventional art.

As shown in FIG. 1, a transmit end performs a communication using a subchannel of a tile structure having a size of 4×3.

The transmit end allocates dedicated pilots to respective receive ends such that the pilots are orthogonal to each other. For example, a transmit end allocates a first tone and a twelfth tone as pilots of a first receive end, and allocates a third tone and a tenth tone as pilots of a second receive end. The transmit end uses tones other than the tones allocated for the pilot signals, as tones for data transmission.

A receive end estimates an effective channel by stream using a pilot signal received from a transmit end. Then, the receive end generates a matched filter using the estimated channel and a characteristic of the coordinated beamforming technique. Here, the receive end uses the matched filter as a postcoder that can obtain a maximum signal to interference and noise ratio.

The multiple antenna system can construct streams of the same number as number of antennas of a transmit end irrespective of number of antennas of a receive end because of the characteristic of the coordinated beamforming technique. That is, the transmit end can recognize a plurality of receive ends as respective receive antennas and simultaneously construct streams for the respective receive ends. The transmit end can increase a transmission rate of a system by being able to construct a multiple stream.

However, an increase of number of receive ends serviced by the transmit end results in an increase of dedicated pilots allocated to the respective receive ends, and thus, resources for the dedicated pilots linearly increase. Here, the multiple antenna system has a problem that with an increase of radio resources for pilot transmission, radio resources for data transmission decrease.

SUMMARY OF THE INVENTION

To address the above-discussed deficiencies of the prior art, it is a primary object of the present invention to substantially solve at least the above problems and/or disadvantages and to provide at least the advantages below. Accordingly, one aspect of the present invention is to provide an apparatus and method for reducing an overhead caused by pilots in a multiple antenna system.

Another aspect of the present invention is to provide an apparatus and method for reducing an overhead caused by pilots in a multiple antenna system using a coordinated beamforming technique.

A further another aspect of the present invention is to provide an apparatus and method for transmitting a pilot for one stream using the orthogonality of a pilot signal, thus reducing an overhead caused by pilots in a multiple antenna system using a coordinated beamforming technique.

The above aspects are achieved by providing an apparatus and method for pilot transmission in a wireless communication system.

According to one aspect of the present invention, a method for transmitting a signal in a transmit end of a wireless communication system is provided. The method includes generating a precode and postcode for coordinated beamforming using channel information of one or more streams for transmitting signals to one or more receive ends, selecting one or more streams to be allocated pilots using the channel information of the streams, updating the precode according to a reference point for representing an effective channel of non-selected streams orthogonal to an effective channel of the selected streams, and preceding signals transmitted through the streams using the updated precode.

According to another aspect of the present invention, a method for estimating an effective channel in a receive end of a wireless communication system is provided. The method includes estimating a channel using a pilot received through at least one stream, when the pilot is not a pilot allocated to the receive end itself, generating a vector orthogonal to the estimated channel, confirming a reference point updating a precode to represent an effective channel of streams without pilot orthogonal to an effective channel of streams allocated pilots in a transmit end, and generating an effective channel of the receive end by applying the reference point to the vector.

According to a further another aspect of the present invention, a transmit end apparatus for transmitting a signal in a wireless communication system is provided. The apparatus includes a channel confirmer, a weight generator, a stream selector, a converter, and a precoder. The channel confirmer confirms channel information of one or more streams for transmitting signals to one or more receive ends. The weight generator generates a precode and postcode for coordinated beamforming using the channel information. The stream selector selects one or more streams to be allocated pilots using the channel information of the streams. The converter updates the precode according to a reference point for representing an effective channel of non-selected streams orthogonal to an effective channel of the selected streams. The precoder precodes signals transmitted through the streams using the updated precode.

According to yet another aspect of the present invention, a receive end apparatus for estimating an effective channel in a wireless communication system is provided. The apparatus includes a channel estimator, a vector generator, and an effective channel generator. The channel estimator estimates a channel using a pilot received through one or more streams according to one or more antennas. The vector generator generates a vector orthogonal to the estimated channel when the pilot is not a pilot allocated to a receive end itself. The effective channel generator generates an effective channel of the receive end by applying a reference point to the vector, wherein, the reference point updates a precoder to represent an effective channel of streams without pilot orthogonal to an effective channel of streams allocated pilots in a transmit end.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 2A and 2B are diagrams illustrating an effective channel of a wireless communication system according to an exemplary embodiment of the present invention;

DETAILED DESCRIPTION OF THE INVENTION

Figure 1:
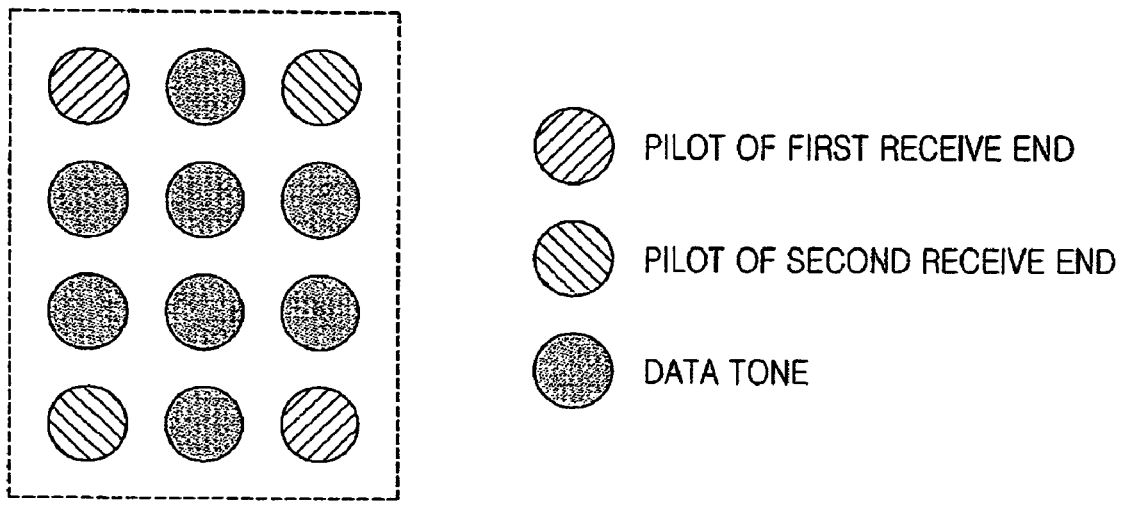
FIG. 1 is a diagram illustrating a subchannel structure of a wireless communication system according to the conventional art.

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

A technology for reducing an overhead caused by pilots in a multiuser multiple antenna system according to an exemplary embodiment of the present invention is described below.

In the following description, the multiple antenna system uses a coordinated beamforming technique to reduce interference between receive ends. Thus, a transmit end can provide several streams to one receive end. However, the assumption is that the transmit end transmits one stream to one receive end considering a correlation between antennas of a receive end and a multiuser diversity.

Also, the assumption is that the receive ends include two antennas. However, an exemplary embodiment of the present invention is identically applicable to a case where the receive ends include more than two antennas.

Also, the assumption is that the channels of the multiple antenna system change slowly and the channels are flat fading.

In the multiple antenna system, a transmit end allocates a pilot to a partial stream so as to reduce an overhead caused by pilots. The transmit end sets a reference point of an effective channel on a transmission signal. The reference point enables the receive ends to receive signals through streams without the use of a pilot to estimate the effective channels. The transmit end allocates pilots to streams numbering one less than the number of antennas of a receive end.

When using the coordinated beamforming technique, a transmit end generates a precoder and postcoder using downlink channel information with a received end located and enabled in a service area. The transmit end generates precoders and postcoders such that, as shown in FIG. 2, channels of receive ends for signals transmitted over radio channels are orthogonal to each other.

FIGS. 2A and 2B are diagrams illustrating an effective channel of a wireless communication system according to an exemplary embodiment of the present invention.

FIG. 2A shows the non-orthogonality of precoders generated by a transmit end, and FIG. 2B shows the orthogonality of precoded pilot signals received over radio channels (H1, H2) by receive ends.

When using the coordinated beamforming technique, a transmit end does not use a unitary matrix as a precoder. Thus, the transmit end generates a precode (T1) of a first receive end and a precode (T2) of a second receive end that are not orthogonal to each other as shown in FIG. 2A.

The transmit end generates precodes (T1, T2) making signals received at the received ends orthogonal. The signals are precoded and transmitted at the transmit end, so as to make the receive ends cancel the interference using the orthogonality of the signals. Thus, the effective channels estimated by the receive ends using pilots precoded and received from the transmit end are orthogonal to each other as shown in FIG. 2B.

When using the coordinated beamforming technique, effective channels estimated using signals precoded and transmitted from a transmit end are orthogonal to each other in receive ends. The receive ends can estimate their own effective channels using a pilot signal of a different receive end if the receive ends have knowledge of a reference point of an effective channel.

Thus, if a transmit end allocates a pilot to a stream for one receive end and sets a reference point of an effective channel for streams of other receive ends, even receive ends receiving signals through streams without a pilot can estimate their own effective channels.

A transmit end can estimate effective channels for streams of respective receive ends because the transmit end is aware of channel state information for the respective receive ends and precodes for the respective receive ends. Thus, the transmit end updates precodes for the respective receive ends such that the effective channels for the streams can have a constant reference point. For example, the transmit end sets a reference point such that first elements of the estimated effective channels have real values and positive integers. After that, when an effective channel estimated for a stream without a pilot is equal to $[\alpha\ \beta]^T$, the transmit end generates a reference value $$\frac{\alpha^*}{|\alpha|}$$

for the reference point of the stream without the pilot considering normalization. The reference value represents a phase rotation value for setting the reference point of the effective channel.

Then, the transmit end updates precodes for respective receive ends using the generated reference value.

A construction of a transmit end for allocating a pilot for one stream is described below.

Figure 3:
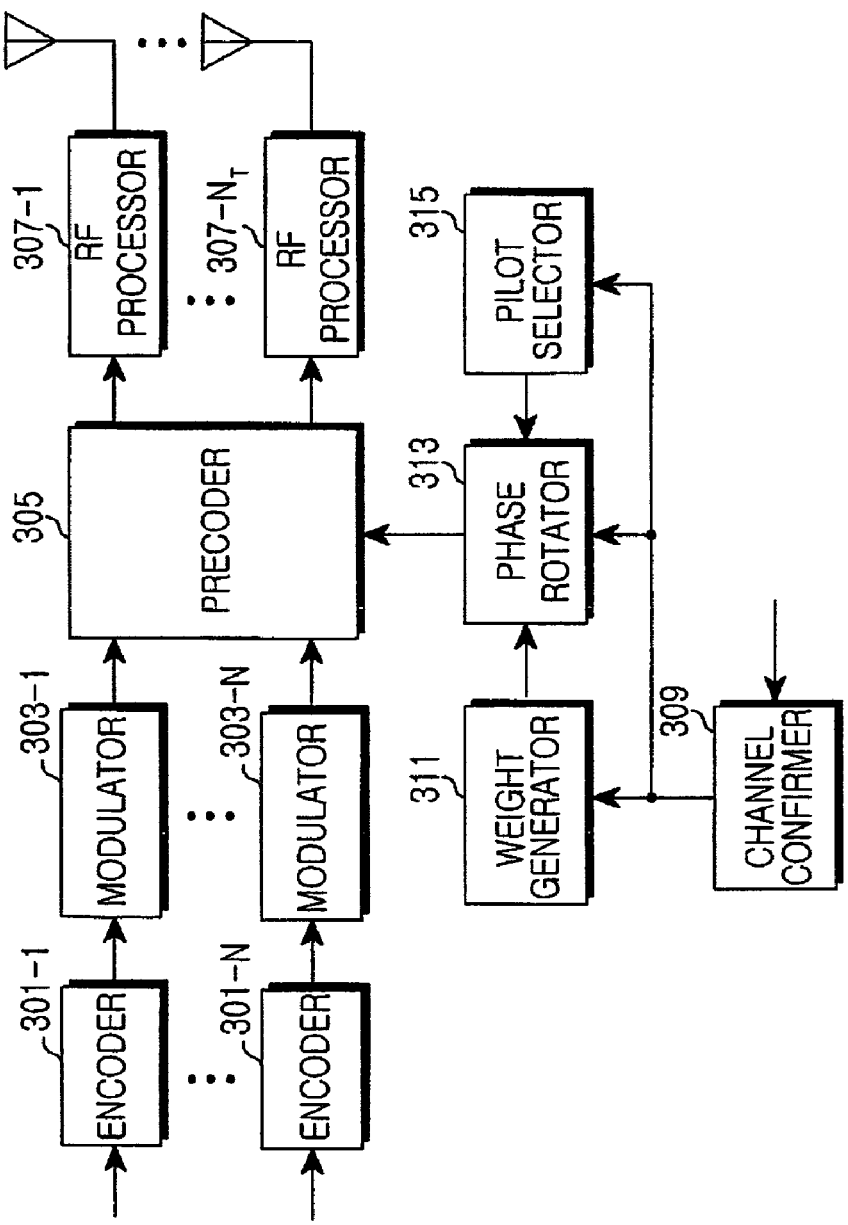
FIG. 3 is a block diagram illustrating a construction of a transmit end in a wireless communication system according to an exemplary embodiment of the present invention.

FIG. 3 is a block diagram illustrating a construction of a transmit end in a wireless communication system according to an exemplary embodiment of the present invention.

As shown in FIG. 3, the transmit end includes encoders 301-1 to 301-N, modulators 303-1 to 303-N, a precoder 305, radio frequency (RF) processors 307-1 to 307-NT, a channel confirmer 309, a weight generator 311, a phase rotator 313, and a pilot selector 315.

The encoders 301-1 to 301-N encode transmission data to be transmitted to respective receive ends according to modulation levels suitable for channel states of the respective receive ends. The modulation level means a Modulation and Coding Scheme (MCS) level.

The modulators 303-1 to 303-N modulate signals received from the respective encoders 301-1 to 301-N according to modulation levels suitable for channel states of respective receive ends.

The precoder 305 precodes signals received from the modulators 303-1 to 303-N by precodes received from the phase rotator 313 and outputs the precoded signals to the RF processors 307-1 to 307-NT connecting to respective antennas. That is, the precoder 305 multiplies weights received from the phase rotator 313 by data to be transmitted through respective streams to form a beam for each stream.

The phase rotator 313 generates a reference value for setting a reference point of an effective channel for streams without a pilot. For example, the phase rotator 313 estimates an effective channel for streams without a pilot using channel information for streams received from the channel confirmer 309. After that, the phase rotator 313 generates a reference value for setting a reference point of the effective channel for the streams without a pilot. The reference value represents a phase rotation value for setting the reference point for the effective channel of the streams without a pilot.

The phase rotator 313 updates a precode received from the weight generator 311 by the generated reference value and provides the updated precode to the precoder 305. For example, the phase rotator 313 updates precode of the streams without a pilot by the reference value. That is, the phase rotator 313 multiplies the precoders of the streams without a pilot by the reference value and provides the multiplied precode to the precoder 305.

The channel confirmer 309 confirms channel states of streams for transmitting data to receive ends located in a service area. For example, the channel confirmer 309 estimates the channel states of the streams using sounding signals transmitted by the receive ends. Alternatively, the channel confirmer 309 confirms channel state information included in feedback signals received from the receive ends.

The pilot selector 315 selects a stream allocated a pilot among streams for receive ends located in a service area. For example, the pilot selector 315 selects a fixed stream previously determined in order to allocate a pilot.

Alternatively, when transmitting pilots through respective streams, the pilot selector 315 selects a stream for pilot transmission having the best sum rate for the whole stream. For instance, if there are two streams, the pilot selector 315 predicts a sum rate for the whole stream using known channel information for respective streams and noise level of receive ends on the assumption that it has transmitted a pilot through a first stream. Also, the pilot selector 315 predicts a sum rate for the whole stream using known channel information for respective streams and noise level of receive ends on the assumption that it has transmitted a pilot through a second stream. After that, the pilot selector 315 selects a stream for pilot transmission having the best sum rate, as a stream to be allocated a pilot.

Alternatively, when transmitting pilots through respective streams, the pilot selector 315 selects a stream for pilot transmission having a greatest value among signal levels to reach receive ends. For instance, if there are two streams, when transmitting a pilot through a first stream, the pilot selector 315 can estimate signal level to reach a first receive end and a second receive end using knowledge of channel information for respective streams. Thus, the pilot selector 315 can predict the first minimum value among the signal levels to reach the receive ends. After that, when transmitting a pilot through a second stream, the pilot selector 315 predicts a second minimum value among signal levels to reach the receive ends and compares the second minimum value with the first minimum value. After that, the pilot selector 315 selects a stream for pilot transmission having a greatest minimum value among signal levels to reach receive ends as a stream to be allocated a pilot.

Alternatively, when transmitting pilots through respective streams, the pilot selector 315 selects a stream for pilot transmission having the largest signal level among signal levels to reach receive ends.

The weight generator 311 generates precodes for transmitting data through respective streams and postcodes of receive ends receiving data through the respective streams using channel information for the respective streams received from the channel confirmer 309. That is, the weight generator 311 generates precodes and postcodes according to a coordinated beamforming technique using the channel information of the streams.

The RF processors 307-1 to 307-NT convert data received from the precoder 305 into analog signals. Then, the RF processors 307-1 to 307-NT convert the analog signals into actual transmissible RF signals and transmit the RF signals through corresponding antennas.

As described above, a transmit end updates a precode to allocate a pilot to one stream, sets a reference point of an effective channel for the remaining streams, and transmits a signal.

When a pilot is allocated to a stream of a receive end, the receive end estimates a channel using the pilot. Then, the receive end generates a matched filter using the estimated channel. The receive end uses the matched filter as a postcode being able to obtain a maximum signal to interference and noise ratio, thus detecting an original signal without interference.

When a pilot is not allocated to a stream of a receive end, the receive end estimates an effective channel using a pilot allocated to a stream of a different receive end. Then, the receive end estimates its own effective channel using a vector orthogonal to the effective channel and a reference value setting a reference point at a transmit end. Then, the receive end generates a matched filter using its own estimated effective channel.

A construction of a receive end for estimating an effective channel and generating a matched filter as above is described below.

Figure 4:
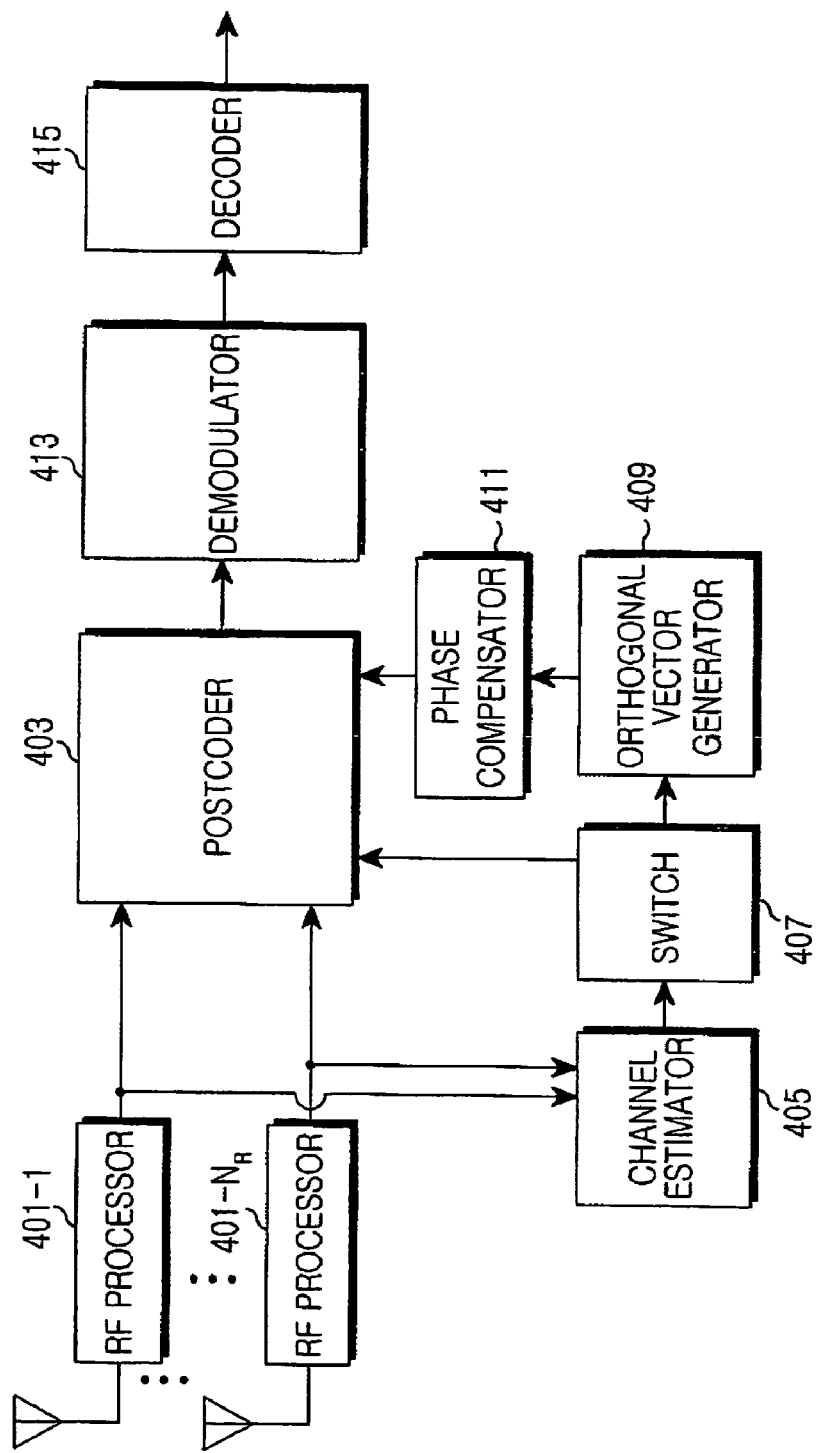
FIG. 4 is a block diagram illustrating a construction of a receive end in a wireless communication system according to an exemplary embodiment of the present invention.

FIG. 4 is a block diagram illustrating a construction of a receive end in a wireless communication system according to an exemplary embodiment of the present invention.

Referring to FIG. 4, the receive end includes RF processors 401-1 to 401-$N_R$, a postcoder 403, a channel estimator 405, a switch 407, an orthogonal vector generator 409, a phase compensator 411, a demodulator 413, and a decoder 415.

The RF processors 401-1 to 401-$N_R$ convert RF signals received through respective antennas into baseband signals.

The channel estimator 405 estimates a channel with a transmit end using pilots included in signals received from the RF processors 401-1 to 401-$N_R$.

The switch 407 switches channel estimation information depending on whether a pilot used by the channel estimator 405 to estimate a channel is allocated to a stream for the receive end. For example, when the channel estimator 405 estimates a channel using a pilot allocated to a stream for the receive end, the switch 407 switches the channel estimation information to the postcoder 403. The postcoder 403 generates a matched filter using channel information estimated by the channel estimator 405, thus postcoding received data.

When the channel estimator 405 estimates a channel using a pilot allocated to a stream for a different receive end, not the stream for the receive end, the switch 407 switches the channel estimation information to the orthogonal vector generator 409.

The orthogonal vector generator 409 generates a vector orthogonal to channel estimation information received from the channel estimator 405. For example, when a channel estimated by the channel estimator 405 is equal to $[\alpha \ \beta]^T$, the orthogonal vector generator 409 generates a vector $[-\beta^* \ \alpha]^T$ orthogonal to the estimated channel.

The phase compensator 411 confirms a reference value generated for the transmit end to set a reference point for an effective channel for streams without a pilot. For example, the phase compensator 411 can confirm a reference value predefined between a transmit end and a receive end during system design or confirm reference value information for transmitting the reference value from the transmit end to the receive end over a separate control channel. The reference value represents a phase rotation value for rotating a phase of the effective channel to set the reference point of the effective channel of the streams. Thus, the phase compensator 411 is also called an effective channel generator.

The phase compensator 411 generates its own effective channel by compensating a phase of an orthogonal vector received from the orthogonal vector generator 409 according to the confirmed reference value.

The postcoder 403 generates a matched filter for an effective channel received from the phase compensator 411, thus postcoding received data.

The demodulator 413 demodulates a signal received from the postcoder 403 according to a corresponding modulation level.

The decoder 415 decodes a signal received from the demodulator 413 according to a corresponding modulation level, thus detecting original data.

A method for allocating a pilot to one stream, setting a reference point of an effective channel for remaining streams, and transmitting a signal in a transmit end is described below.

Figure 5:
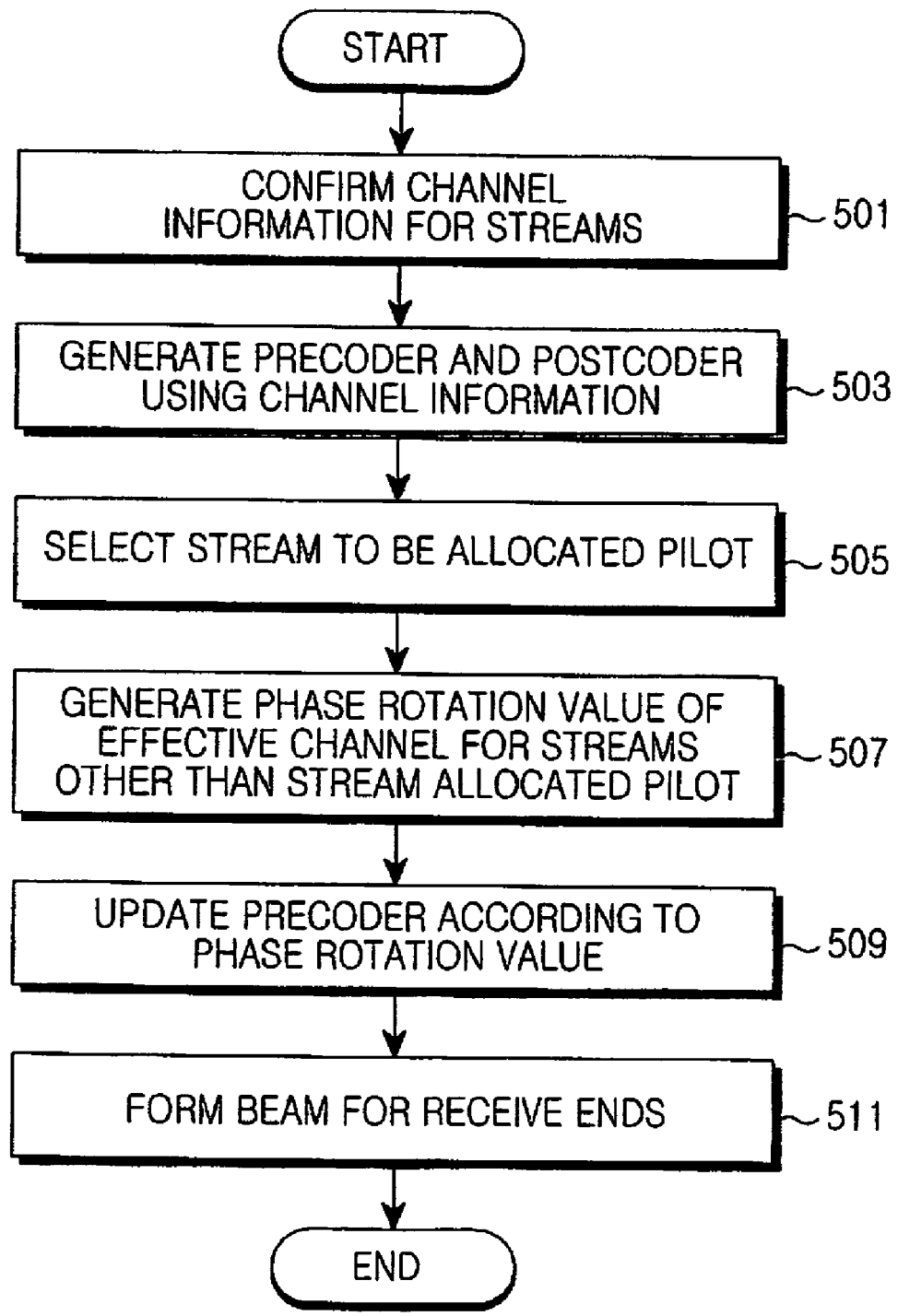
FIG. 5 is a flow diagram illustrating a process of forming a beam at a transmit end of a wireless communication system according to an exemplary embodiment of the present invention.

FIG. 5 is a flow diagram illustrating a process of forming a beam at a transmit end of a wireless communication system according to an exemplary embodiment of the present invention.

Referring to FIG. 5, in step 501, the transmit end confirms channel information for streams with receive ends enabled in a service area. For example, the transmit end can estimate a downlink channel for each stream using sounding signals transmitted by the receive ends. Alternatively, the transmit end can confirm a downlink channel for each stream through channel state information fed back by the receive ends.

After confirming the channel information, in step 503, the transmit end generates precodes and postcodes for the streams using the channel information.

After generating the precodes and postcodes, in step 505, the transmit end selects a stream to be allocated a pilot. For example, the transmit end selects a fixed stream previously determined in order to allocate a pilot.

Alternatively, when transmitting a pilot through each stream, the transmit end selects a stream for pilot transmission having the best sum rate for the whole stream. For instance, if there are two streams, the transmit end predicts a sum rate for the whole stream using known channel information for each stream and noise levels of the receive ends on the assumption that it has transmitted a pilot through a first stream. Also, the transmit end predicts a sum rate for the whole stream using known channel information for each stream and noise levels of the receive ends on the assumption that it has transmitted a pilot through a second stream. Then, the transmit end selects a stream for pilot transmission having the best sum rate as a stream to be allocated a pilot.

Alternatively, when transmitting a pilot through each stream, the transmit end selects a stream for pilot transmission having a greatest minimum value among signal levels to reach the receive ends. For instance, if there are two streams, when transmitting a pilot through a first stream, the transmit end can estimate signal levels to reach a first receive end and a second receive end because the transmit end has knowledge of channel information for each stream. Thus, the transmit end can predict a first minimum value among signal levels to reach the receive ends. After that, when transmitting a pilot through a second stream, the transmit end predicts a second minimum value among signal levels to reach the receive ends and compares the second minimum value with the first minimum value. After that, the transmit end selects a stream for pilot transmission having a greatest minimum value among signal levels to reach receive ends as a stream to be allocated a pilot.

Alternatively, when transmitting a pilot through each stream, the transmit end selects a stream for pilot transmission having the largest signal level among signal levels to reach receive ends. After selecting the stream to be allocated the pilot, in step 507, the transmit end generates a reference value for setting a reference point of an effective channel for streams without a pilot.

That is, the transmit end can estimate effective channels of respective streams for the receive ends because the transmit end has knowledge of the channel information for the streams and the precodes. Thus, the transmit end generates a phase rotation value for setting the reference point of the estimated effective channels. For example, when setting a reference point such that first elements of the effective channels have real values and positive integers, the transmit end estimates an effective channel (e.g., $[\alpha\ \beta]^T$) for streams without a pilot. After that, the transmit end generates a phase rotation value (e.g., $$\left(\text{e.g.,}\ \frac{\alpha^*}{|\alpha|}\right)$$

for setting the reference point of the effective channel of the streams. The reference value represents a phase rotation value for rotating a phase of the effective channel to set the reference point of the effective channel for the streams.

After generating the phase rotation value of the effective channel, in step 509, the transmit end updates the precode using the phase rotation value. That is, the transmit end phase-rotates the precode by the phase rotation value.

After updating the precode, in step 511, the transmit end precodes a pilot and data allocated to one stream by the precodes and transmits the precoded pilot and data to the receive ends. That is, the transmit end forms a beam for the receive ends using the precodes of the streams for the receive ends.

After that, the transmit end terminates the process according to an exemplary embodiment of the present invention.

A method for estimating an effective channel using a pilot for one stream and generating a matched filter at a receive end is described below.

Figure 6:
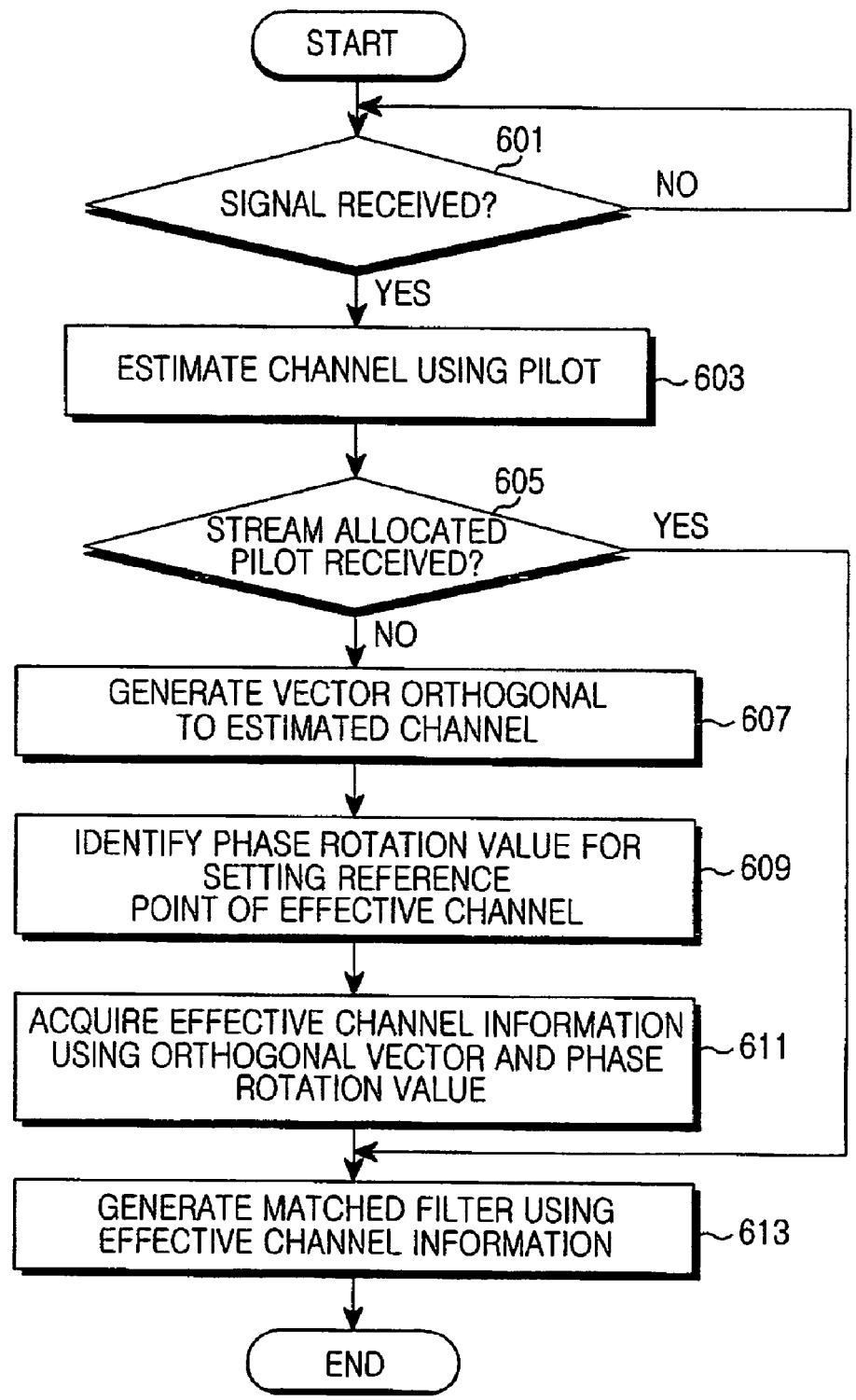
FIG. 6 is a flow diagram illustrating a process of estimating an effective channel at a receive end of a wireless communication system according to an exemplary embodiment of the present invention.

FIG. 6 is a flow diagram illustrating a process of estimating an effective channel at a receive end of a wireless communication system according to an exemplary embodiment of the present invention.

Referring to FIG. 6, in step 601, the receive end confirms whether it received a signal from a transmit end.

Upon receiving a signal, in step 603, the receive end estimates a channel using a pilot included in the received signal.

After estimating the channel, in step 605, the receive end confirms whether the pilot is a pilot allocated to the receive end itself. That is, the receive end confirms whether itself is a receive end receiving data through a stream allocated a pilot.

If the pilot is a pilot allocated to the receive end itself, in step 613, the receive end generates a matched filter using the effective channel estimated in step 603.

If the pilot is not a pilot allocated to the receive end itself, in step 607, the receive end generates a vector orthogonal to the channel estimated using the pilot. For example, when the channel estimated in step 603 is equal to $[\alpha\ \beta]^T$, the receive end generates a vector $[-\beta^*\ \alpha]^T$ orthogonal to the estimated channel.

After generating the orthogonal vector, in step 609, the receive end confirms a reference value generated for the transmit end to set a reference point of an effective channel of streams without a pilot. The receive end can use a reference value predefined between a transmit end and a receive end during system design or confirm the reference value received from the transmit end through a separate control channel. The reference value represents a phase rotation value for rotating a phase of the effective channel to set the reference point of the effective channel of the streams.

After confirming the phase rotation value, in step 611, the receive end estimates its own effective channel by multiplying the orthogonal vector by the phase rotation value. That is, the receive end phase-rotates the orthogonal vector by the phase rotation value and estimates an effective channel.

After estimating the effective channel, in step 613, the receive end generates a matched filter using the estimated effective channel in step 611.

After that, the receive end terminates the process according an exemplary embodiment of the present invention.

In the aforementioned exemplary embodiment of the present invention, a transmit end can reduce an overhead caused by pilots by allocating pilots to streams numbering one less than number of antennas of a receive end. Alternatively, the transmit end can also reduce an overhead by using a coordinated pilot.

A description of performance variation when allocating a pilot to a partial stream and transmitting a signal in the wireless communication system is made below.

Figure 7:
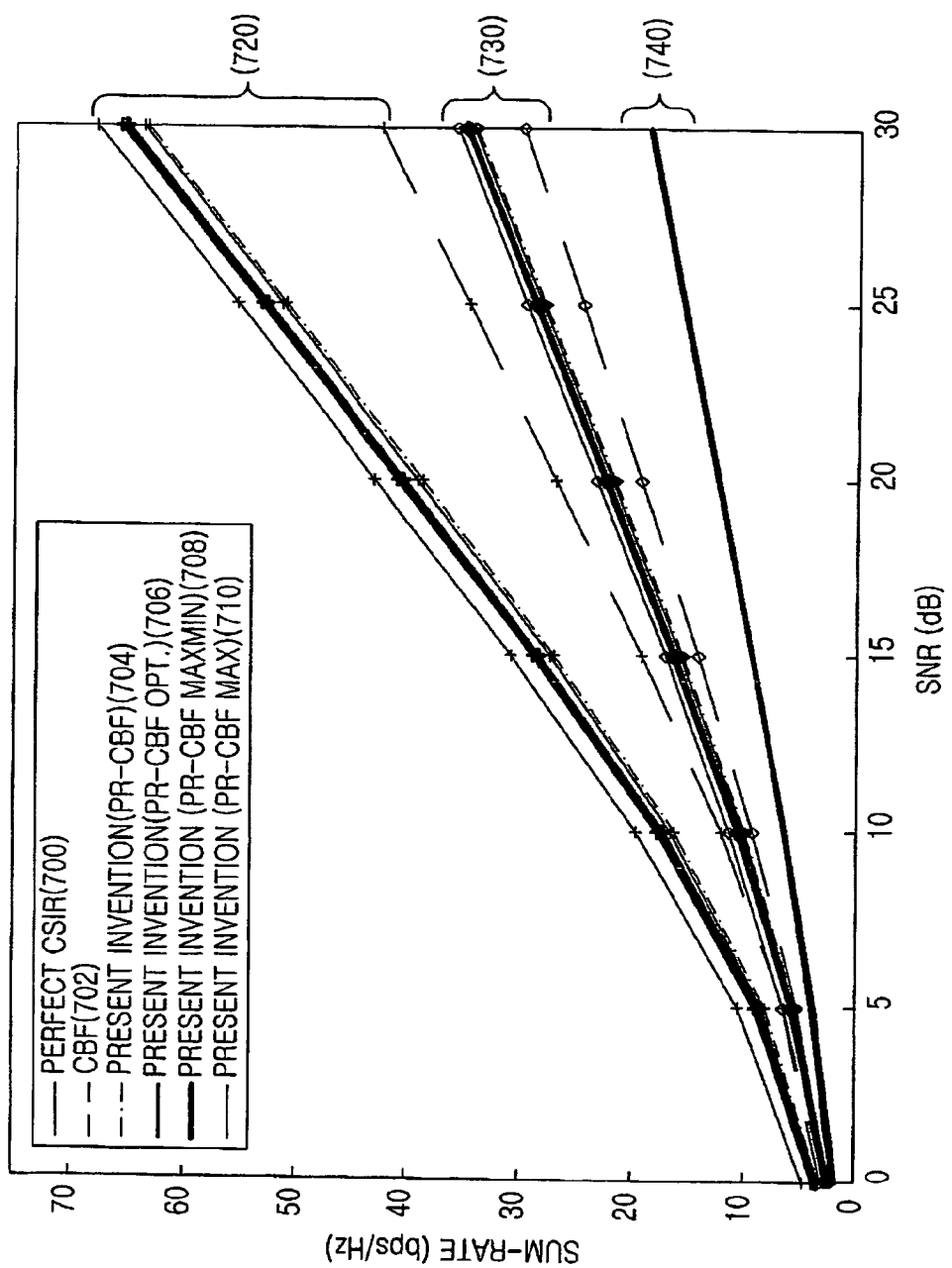
FIG. 7 is a graph illustrating performance variation according to an exemplary embodiment of the present invention.

FIG. 7 is a graph illustrating performance variation according to an exemplary embodiment of the present invention. In the following description, a horizontal axis denotes a signal to noise ratio (SNR) and a vertical axis denotes a sum rate. The sum rate represents a sum of data rates of receive ends receiving signals through respective streams.

FIG. 7 shows sum rates for a coordinated beamforming (CBF) technique according to the conventional art (702) and sum rates for the cases of allocating a pilot to a partial stream according to an exemplary embodiment of the present invention (704, 706, 708, and 710). Black line 700 denotes a sum rate based on the assumption that a transmit end perfectly estimates a channel of a receive end.

When a transmit end has eight antennas and eight receive ends each have two antennas (720), sum rates for the cases of allocating a pilot to a partial stream according to an exemplary embodiment of the present invention (704, 706, 708, and 710) are higher than the sum rates for the coordinated beamforming (CBF) technique (702).

Even in an exemplary embodiment of the present invention, sum rates are different depending on a pilot allocation scheme. For example, sum rates for a scheme (706) of selecting a stream maximizing a sum rate for the whole stream and a scheme (708) of selecting a stream having a greatest minimum value among signal levels are higher than sum rates for a scheme (704) of selecting a stream to be randomly allocated a pilot and a scheme (710) of selecting a stream to maximize a signal level.

Even when a transmit end has four antennas and four receive ends each have two antennas (730) and when the transmit end has two antennas and two receive ends each have two antennas (740), the same performance variations as described above are shown.

As described above, an exemplary embodiment of the present invention has an advantage that a transmit end of a multiple antenna system allocates a pilot to a partial stream, sets a reference point of precodes for streams without a pilot, and transmits a signal, thus being capable of reducing an overhead caused by pilots and increasing a spectral efficiency, and additionally allocates a pilot to a stream allocated a pilot, thus being capable of improving channel performance.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for transmitting signals in a transmit end of a wireless communication system, the method comprising:
    generating a precode and a postcode for coordinated beamforming using channel information of a plurality of streams for transmitting signals to one or more receive ends;
    selecting the streams to be allocated pilots using the channel information of the streams, wherein selecting the streams comprises selecting a stream using a scheme selected from a group comprising a scheme of selecting a fixed stream, a scheme of selecting a stream maximizing a sum rate of the whole stream when transmitting pilots through respective streams, a scheme of selecting a stream having a greatest minimum value among signal levels measured at respective receive ends when transmitting a pilot through each stream, and a scheme of selecting a stream having a greatest signal level among signal levels to reach the one or more receive ends when transmitting pilots through respective streams;
    updating the precode according to a reference point representing an effective channel of non-selected streams orthogonal to an effective channel of the selected streams; and
    precoding the signals transmitted through the streams using the updated precode.

2. The method of claim 1, wherein selecting the streams comprises selecting, as streams for pilot allocation, streams numbering one less than a number of antennas of the one or more receive ends among the streams.

3. The method of claim 1, wherein updating the precode comprises:
    estimating the effective channel of the non-selected streams using the channel information of the streams and the precode; and
    updating the precode according to the reference point for representing the effective channel of the non-selected streams orthogonal to the effective channel of the selected streams.

4. The method of claim 3, wherein updating the precode comprises:
    generating a phase rotation value for setting the reference point of the effective channel of the non-selected streams; and
    updating the precode by the phase rotation value.

5. The method of claim 3, wherein updating the precode comprises updating a precode for the non-selected streams by a reference value.

6. The method of claim 1, further comprising transmitting an information signal on the reference point of the effective channel to the one or more receive ends.

7. A transmit end apparatus for transmitting signals in a wireless communication system, the apparatus comprising:
    a channel confirmer configured to confirm channel information of a plurality of streams for transmitting the signals to one or more receive ends;
    a weight generator configured to generate a precode and a postcode for coordinated beamforming using the channel information;
    a stream selector configured to select the streams to be allocated pilots using the channel information of the streams, wherein the stream selector is further configured to select a stream using a scheme selected from a group comprising a scheme of selecting a fixed stream, a scheme of selecting a stream maximizing a sum rate of the whole stream when transmitting pilots through respective streams, a scheme of selecting a stream having a greatest minimum value among signal levels measured at respective receive ends when transmitting a pilot through each stream, and a scheme of selecting a stream having a greatest signal level among signal levels to reach the one or more receive ends when transmitting pilots through respective streams;
    a converter configured to update the precode according to a reference point for representing an effective channel of non-selected streams orthogonal to an effective channel of the selected streams; and
    a precoder configured to precode the signals transmitted through the streams using the updated precode.

8. The apparatus of claim 7, wherein the stream selector is further configured to select, as streams for pilot allocation, streams numbering one less than a number of antennas of the one or more receive ends among the streams.

9. The apparatus of claim 7, wherein the converter is further configured to estimate the effective channel of the non-selected streams using the channel information of the streams and the precode, and update the precode by the reference point for representing the effective channel of the non-selected streams orthogonal to the effective channel of the selected streams.

10. The apparatus of claim 9, wherein the converter is further configured to generate a phase rotation value for setting the reference point of the effective channel of the non-selected streams, and update the precode by the phase rotation value.

11. The apparatus of claim 7 further comprising:
    a transmitter configured to transmit an information signal on the reference point of the effective channel to the one or more receive ends.

12. A method for transmitting signals in a transmit end of a wireless communication system, the method comprising:
    generating a precode and a postcode for coordinated beamforming using a channel information of a plurality of streams for transmitting the signals to one or more receive ends;

selecting the streams to be allocated pilots using the channel information of the streams, wherein selecting the streams comprises:

selecting a stream using a scheme selected from a group of schemes consisting of a scheme of selecting a fixed stream, a scheme of selecting a stream maximizing a sum rate of the whole stream when transmitting pilots through respective streams, a scheme of selecting a stream having a greatest minimum value among signal levels measured at respective receive ends when transmitting a pilot through each stream, and a scheme of selecting a stream having a greatest signal level among signal levels to reach the one or more receive ends when transmitting pilots through respective streams;

updating the precode according to a reference point representing an effective channel of non-selected streams orthogonal to an effective channel of the selected streams; and precoding the signals transmitted through the streams using the updated precode.

* * * * *